Figure 1:
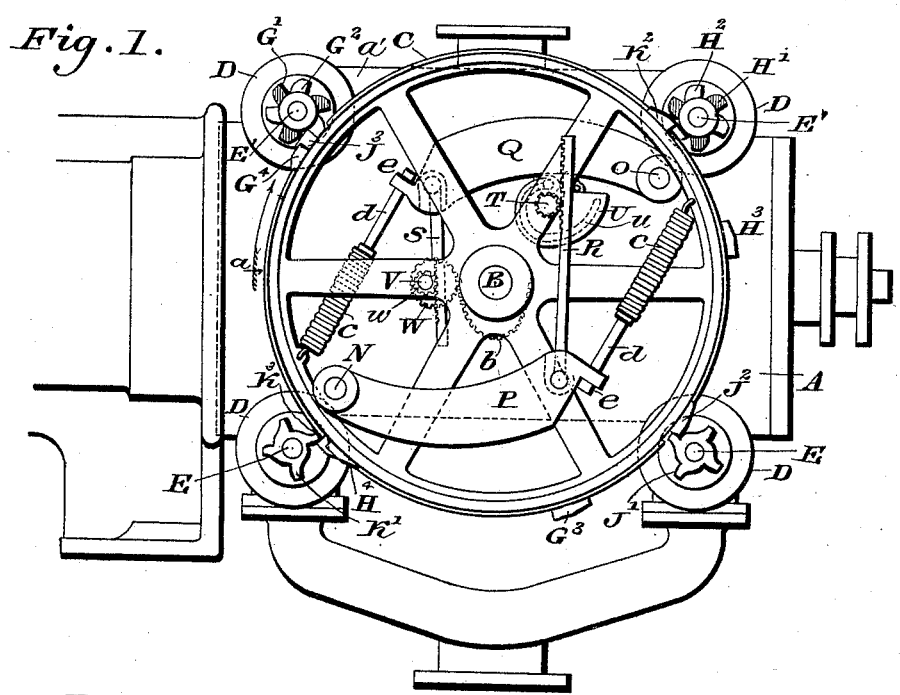

(No Model.) 3 Sheets—Sheet 1.

F. HERLT & J. HIRSCHMANN.
VALVE GEAR FOR ENGINES.

No. 475,942. Patented May 31, 1892.

WITNESSES:
O. F. Nagle
L. Douville

INVENTORS
Franz Herlt
Josef Hirschmann
BY
John A. Wiederscheim
ATTORNEY.

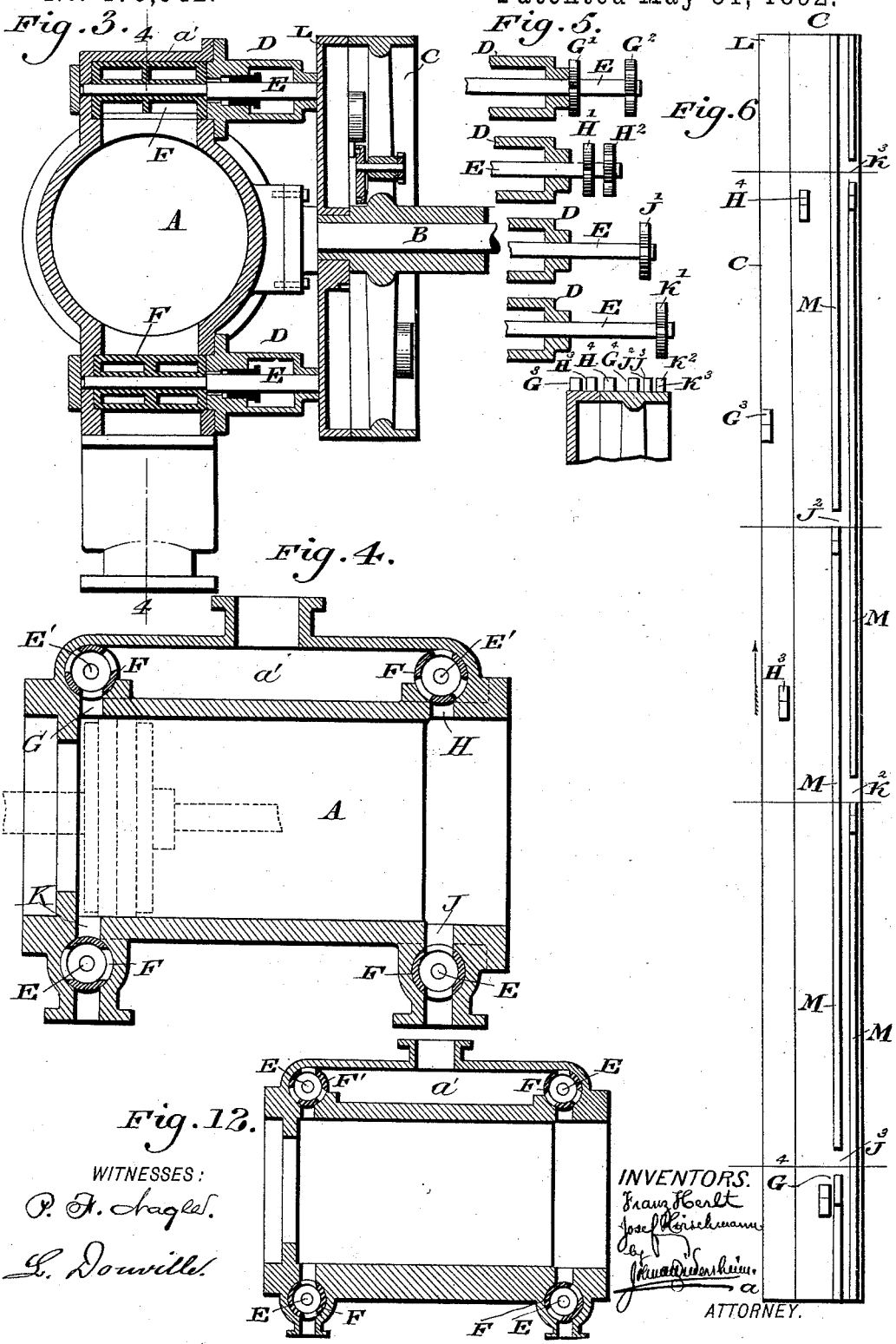

(No Model.) 3 Sheets—Sheet 3.
F. HERLT & J. HIRSCHMANN.
VALVE GEAR FOR ENGINES.
No. 475,942. Patented May 31, 1892.
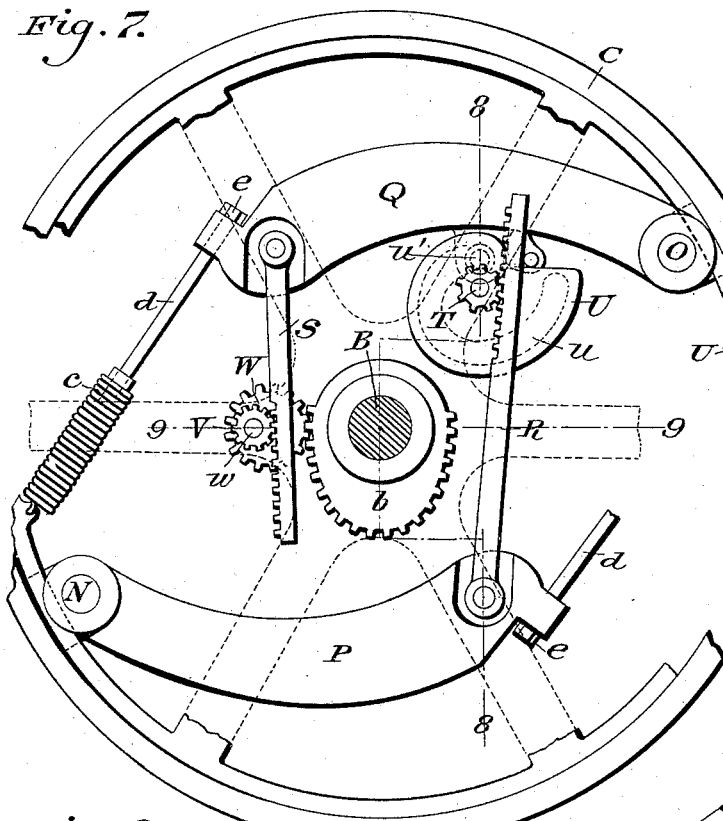
Fig. 7.
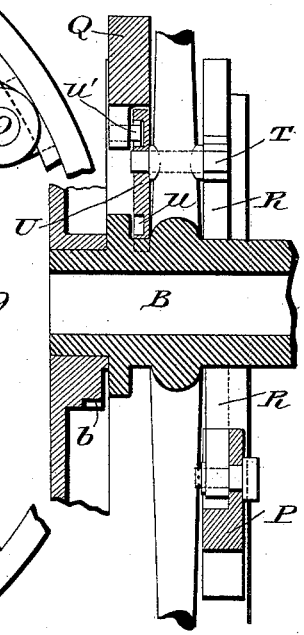
Fig. 8.
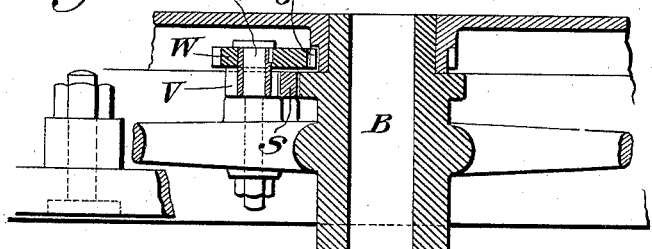
Fig. 9.
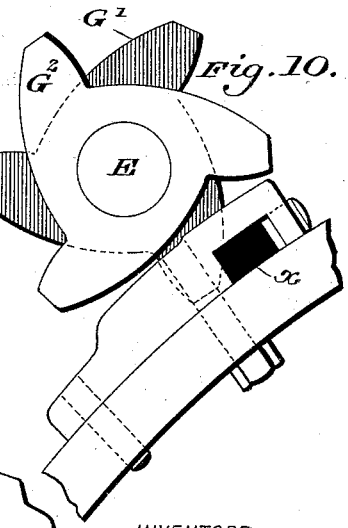
Fig. 10.
Fig. 11.
WITNESSES:
P. F. Chaples
L. Douville
INVENTORS:
Franz Herlt
Josef Hirschmann
BY
John A. Biedersheim
ATTORNEY.

UNITED STATES PATENT OFFICE.

FRANZ HERLT AND JOSEF HIRSCHMANN, OF PHILADELPHIA, PENNSYLVANIA.

VALVE-GEAR FOR ENGINES.

SPECIFICATION forming part of Letters Patent No. 475,942, dated May 31, 1892.

Application filed January 16, 1892. Serial No. 418,322. (No model.)

*To all whom it may concern:*

Be it known that we, FRANZ HERLT and JOSEF HIRSCHMANN, subjects of the Emperor of Austria-Hungary, residing in the city of Philadelphia, in the county of Philadelphia and State of Pennsylvania, have invented certain new and useful Improvements in Valve-Gear for Steam-Engines, of which the following is a specification.

Our invention relates to steam-engines, and more particularly to the valve-gear and governor for regulating the admittance and discharge of steam in the steam-cylinder.

The object of our invention is to provide simple and efficient devices for automatically regulating and controlling the speed of a steam-engine.

Our invention consists of a steam-engine having a steam-cylinder provided with inlet and exhaust ports and rotary valves located within said ports and controlled by a wheel driven from the main or crank shaft of the engine.

Our invention further consists of a steam-engine having a crank or main shaft, a steam-cylinder provided with inlet and exhaust ports, and rotary valves located within the same and operated by two wheels driven by said crank-shaft.

Our invention further consists of a steam-engine having a crank-shaft, a steam-cylinder provided with inlet and exhaust ports, and rotary valves located within the same and adapted to be operated by two wheels, whereof one wheel is positively driven by suitable gearing from the main shaft and the other or cut-off wheel by the former wheel through a suitable governing connection.

Our invention further consists of a steam-engine having a crank-shaft, a steam-cylinder provided with inlet and exhaust ports, and rotary valves located within the same and adapted to be operated by two wheels, whereof one serves to open successively all the said valves and to close the exhaust-valves and the other to close the inlet-valves and to cut off the steam at the inlet-ports, the two wheels connected by a governor operating to set the cut-off wheel with relation to the other wheel to insure a uniform running of the engine.

Our invention further consists of the improvements hereinafter set forth, and pointed out in the claims.

Our invention will be more fully understood taken in connection with the accompanying drawings, forming part hereof, and in which—

Figure 2:
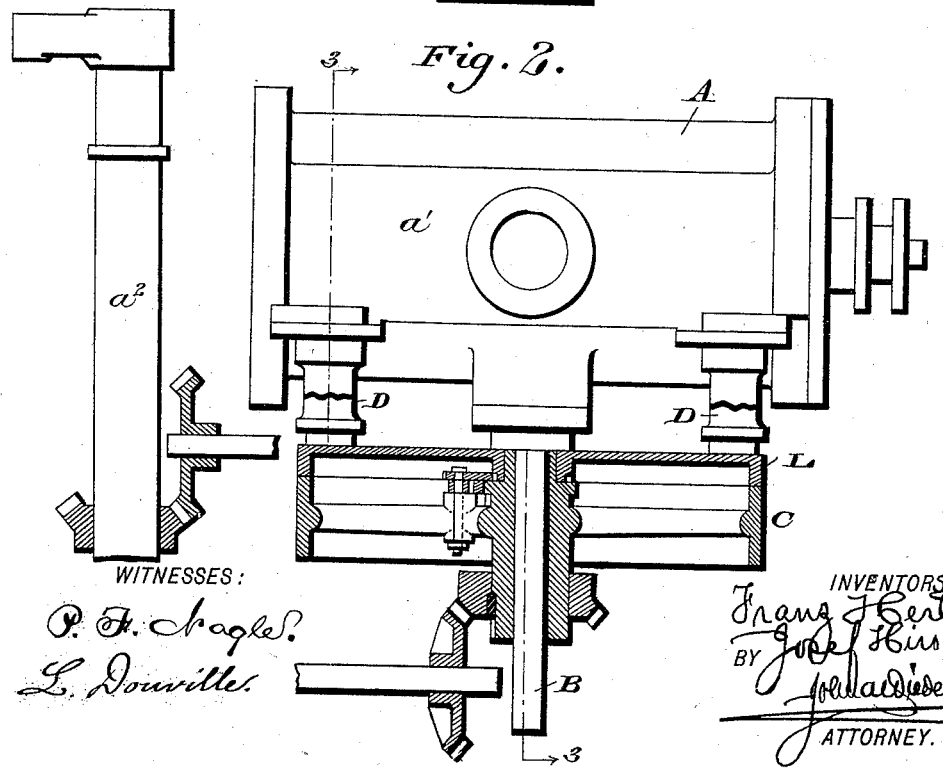

Figure 1 is an elevation of a steam-cylinder, showing our improved valve-gear and governor in application. Fig. 2 is a plan view of Fig. 1, showing the valve-operating and cut-off wheels in section and also showing means for driving said wheels from the main shaft. Fig. 3 is a section on the line 3 3 of Fig. 2, showing the steam-cylinder, the rotary inlet and exhaust valves, and the operating and cut-off wheels. Fig. 4 is a transverse section on the line 4 4 of Fig. 3, showing the relative position of the valves. Fig. 5 is a diagrammatic view showing portions of the valve-cylinder heads and the valve-stems and the toothed wheels secured to their outer ends and the controlling or operating lugs on the operating and cut-off wheels in their relative positions to the toothed wheels on the valve-stems. Fig. 6 is a development of the peripheries of the operating and cut-off wheels and showing the operating or controlling lugs in position. Fig. 7 is an elevation, on a larger scale, of the operating and cut-off wheels and showing a governor for connecting and setting the said wheels relatively to each other. Fig. 8 is a section on the line 8 8 of Fig. 7. Fig. 9 is a section on the line 9 9 of Fig. 7. Fig. 10 is a detail view of the toothed wheels on the rotary steam-inlet valves and showing the position of a corresponding lug on the periphery of the operating-wheel. Fig. 11 is a similar view of the toothed wheel on an exhaust-valve and its corresponding lug, and Fig. 12 is a section of a steam-cylinder chest and the complemental valves and illustrating the effect of the governor on the cut-off wheel and valves.

Referring now to the drawings for a further description of our invention, A is a steam-cylinder of any preferred construction, provided with a steam-chest $a'$, communicating with the steam-cylinder by the ports G and H and with the exhaust-ports J and K. Rotary valves F and F', having fixed stems E and E', are applied to these ports G, H, J, and K in any suitable manner, and the stems E may or may not be supported in the valve-cylinder heads D.

A stud or shaft B is suitably connected with the steam-cylinder A and carries an operating-wheel C, for a purpose hereinafter more fully described. This wheel C is positively driven from the crank-shaft $a^2$ by suitable gearing. Upon the hub of the wheel C is journaled the cut-off wheel L, provided with two lugs $G^3$ and $H^3$, for a purpose to be described.

The valves F' have three ports each, which are equidistant apart, and the stems E' thereof are each provided with two wheels G', $G^2$, H', and $H^2$, each having three teeth, and these wheels are held to the stems E' in such a position as that the teeth of one wheel are located opposite the spaces of the other wheel. The wheels G' and H' are in alignment with their respective lugs $G^3$ and $H^3$ on the cut-off wheel L, and the wheels $G^2$ and $H^2$ are in alignment with their respective lugs $G^4$ and $H^4$, located on the periphery of the operating-wheel C.

The exhaust-valves F are each provided with two ports disposed oppositely to each other. The stems E of these valves F are provided with wheels J' and K', having four teeth each, and are disposed out of alignment with respect to each other and the wheels G', $G^2$, H', and $H^2$. Lugs $J^2$ and $J^3$ and ribs M are provided on the periphery of the wheel C and in alignment with the wheel J', and similar lugs $K^2$ and $K^3$ and ribs M are disposed on the periphery of the wheel C and in alignment with the wheel K' for operating the exhaust-valves in a manner hereinafter more fully described.

The operating-wheel C and cut-off wheel L are connected by a governor consisting of the weighted levers P and Q, pivoted at one of their ends at N and O to the wheel-rim. The other free ends of these levers P and Q are provided with springs c and adjusting-rods d and nuts e for adjusting the tension of the springs c. R and S are racks also pivoted with one of their extremities to the respective free ends of the levers P and Q and mesh with and impart motion to the pinions T and V.

The pinion T is fastened to one end of an arbor journaled in an arm of the wheel C, and a spiral cam U, having a spiral groove u, is fixed to the other end of the arbor. A pin u', having a roller in engagement with the groove u, is secured to a lug on the lever Q.

The pinion V, meshing with and receiving motion from the rack S, is secured concentric and a gear-wheel W is secured eccentric to a stud w. The gear-wheel W meshes with the elliptical segmental gear b, formed on or secured to the hub of the cut-off wheel L.

The operation of our improved valve-gear and governor is as follows: As the crank-shaft $a^2$ is rotated by the piston in the steam-cylinder A, it drives the valve-operating wheel C and cut-off wheel L synchronously therewith, which operates the respective diagonally-disposed inlet and exhaust valves F' and F successively and alternately by their respective wheels G', $G^2$, H', $H^2$, J', and K' and the lugs $G^3$, $H^3$, $H^4$, $G^4$, $J^2$, $J^3$, and $K^2$ and $K^3$. To better illustrate the movement of the valve-gear, one complete turn of the main or crank shaft and the valve-operating wheel and cut-off wheel will be described. Assuming that the wheels C and L are rotated in the direction of the arrow and are in the position as shown in Fig. 1, and starting now at point a, Fig. 1, it will be seen that the lug $G^4$ on the operating-wheel C is about to open the port G, Fig. 4, for the admission of steam, the lug $H^3$ on the cut-off wheel L has passed the wheel H' and closed the port H by a valve F' to allow the admitted steam to expand in the cylinder A and to drive the piston toward the left in Fig. 4 of drawings, the lug $J^2$ on the operating-wheel C is about to open the exhaust-port J by a valve F and wheel J' to let out the steam admitted by the port H, and the lug $K^3$ on the operating-wheel C is about to close the exhaust-port K by the valve F and its wheel K' previous to the admission of steam through the port G. Assuming now that the crank-shaft $a^2$ and wheels C and L have made one-half revolution and starting again at point a in Fig. 1, it will be found that the lug $G^3$ on the cut-off wheel L has passed the wheel G' on the valve F' and closed the port G to allow the steam admitted therethrough to expand in the cylinder A and drive the piston toward the right in the drawings, Fig. 4, the lug $H^4$ on the operating-wheel C is about to open the port H by the valve F' and its wheel $H^2$ to admit steam, the lug $J^3$ on the operating-wheel is about to close the exhaust-port J by the valve F and its wheel J', and the lug $K^2$ on the wheel C is about to open the exhaust-port K by the valve F and its wheel K' previous to the admission of live steam through the port H.

It will be understood that the lugs are disposed with reference to each other so as to correspond to the required periods for the admission, expansion, and exhaust of the steam into and out of the cylinder A.

If preferred, suitable buffers X, of rubber or other material, as shown in Fig. 10, may be provided on the lugs to avoid jarring of the wheels on the valves F' and F and the operating and cut-off wheels C and L.

The ribs M are provided to prevent the exhaust-valves F from being rotated accidentally or otherwise, as will be readily understood from the drawings.

To insure a smooth and uniform running of the steam-engine, the valve-operating and separate cut-off wheels are provided, and the latter is adjusted with reference to the speed of the engine by the governor connecting the valve-operating wheel and cut-off wheel.

The adjusting of the cut-off wheel to avoid racing of the engine is effected by the governor in the following manner: The levers P and Q are adjusted by the springs c, rods d, and nuts $e$, so as to resist a certain centrifugal force at a predetermined speed of the engine, and should such speed increase for any reason whatever the governor will shift the cut-off wheel L and cause a quicker closing of the steam-inlet valve F' in the following manner: As the centrifugal force increases proportionally to the increase of velocity of the wheel C, the racks R and S are caused to move in opposite directions, and the rack R rotates the pinion T, and with it the spiral cam U, which facilitates the moving of the free end of the lever Q toward the periphery of the wheel C by the spiral groove $u$ and roller $u'$. The movement thus given to the lever Q, and which is assisted by its own increased centrifugal force, causes the rack S to rotate the pinion V, the eccentrically-disposed gear-wheel W, and the elliptical gear-segment $b$, which causes the cut-off wheel L to advance in the direction of the rotation, so as to hasten the cut-off of live steam in the steam-cylinder by means of one of the valves F', whereby the regular speed of the engine is restored.

The action of the regulator or governor, with its accessories, on and between the wheels C and L insures a cut-off varying from 0.02 to 0.9 of the piston-stroke, and to obtain such results the eccentrically-disposed gear-wheel W and ellipitical segment $b$, meshing with each other, are provided. The segment $b$ and gear-wheel W are of such a shape and disposed to each other and to the crank-shaft and operating-wheel C in such a way that they will adjust the wheel L to cut off the live steam to the cylinder A at the proper time and at any position of the crank of the shaft $a^2$ and piston in the cylinder A.

Having thus described the nature and objects of our invention, what we claim as new, and desire to secure by Letters Patent, is—

1. A steam-engine comprising a crank-shaft and a steam-cylinder provided with a steam-chest, rotary inlet-valves located within the same, rotary exhaust-valves located in the exhaust-ports of the steam-cylinder, and a wheel driven synchronously with the crank-shaft and adapted to operate said valves, substantially as and for the purposes set forth.

2. A steam-engine comprising a crank-shaft and a steam-cylinder provided with steam admission and exhaust ports, rotary valves located within said ports, and a wheel located outside and longitudinal of the steam-cylinder and moving synchronously with the crank-shaft, said wheel adapted to operate and control the rotary valves, substantially as and for the purposes set forth.

3. In a steam-engine, a crank-shaft and a steam-cylinder, said cylinder having steam admission and exhaust ports, rotary valves located within the same, a governor-wheel supported on said steam-cylinder by a stud and receiving its motion from the crank-shaft, toothed wheels on said rotary valves, and lugs on the rim of the governor-wheel adapted to contact with said wheels and operate said valves, substantially as and for the purposes set forth.

4. A steam-engine comprising a crank or main shaft and a steam-cylinder provided with steam admission and exhaust ports, and rotary valves located within the same and operated by two wheels driven by said crank-shaft, substantially as and for the purposes set forth.

5. A steam-engine comprising a crank-shaft and a steam-cylinder having steam admission and exhaust ports, rotary valves located within the same and each provided with a toothed wheel, and two wheels driven by said crank-shaft and having lugs disposed on the rims of said two wheels, said lugs adapted to contact with said toothed wheels and to operate said valves successively, substantially as and for the purposes set forth.

6. A steam-engine comprising a crank-shaft and a steam-cylinder having steam admission and exhaust ports, and rotary valves located within the same and adapted to be operated by two wheels, whereof one wheel is positively driven from the crank-shaft and the other or cut-off wheel by the former through a suitable governing connection, substantially as and for the purposes set forth.

7. A steam-engine comprising a crank-shaft and a steam-cylinder provided with inlet and exhaust ports, and rotary valves located within said ports and adapted to be operated by two wheels, whereof one serves to open successively all the said valves and close the exhaust-ports and the other to cut off the steam at the inlet-ports, substantially as and for the purposes set forth.

8. A steam-engine comprising a crank-shaft and a steam-cylinder provided with inlet and exhaust ports, and rotary valves located within said ports and adapted to be operated by two wheels, whereof one serves to open all the said valves and close the exhaust-ports and the other to cut off the steam at the inlet-ports, said wheels connected by a governor, substantially as and for the purposes set forth.

9. In a steam-engine, a crank-shaft and steam-cylinder having inlet and exhaust ports, valves located within the same and each having a toothed wheel, two wheels supported by the steam-cylinder and receiving rotary motion from the crank-shaft, and lugs attached to said wheels and adapted to contact with said toothed wheels and to control the said valves, the two wheels connected by a governor, substantially as and for the purposes set forth.

10. In a steam-engine, a set of valves and a valve-gear comprising two wheels connected by a governor, one of said wheels positively driven by the crank-shaft and the other or cut-off wheel adjustably driven by said positively-driven wheel, substantially as and for the purposes set forth.

11. In a steam-engine, two valve-operating wheels connected by a governor consisting of two levers hinged to the rim of one wheel, tension devices between said levers and said rim, and suitable gearing between said two wheels and adapted to be operated by said levers, substantially as and for the purposes set forth.

12. In a steam-engine, a set of valves located in the inlet and exhaust ports and operated by two wheels, whereof one is provided with two levers hinged to the rim thereof, tension devices between said levers and rim, and a rack for each lever and engaging a pinion, one of said pinions attached to a cam and the other to a gear-wheel meshing with a segmental rack on the other wheel, substantially as and for the purposes set forth.

13. An engine having valves provided with toothed wheels, lugs secured to the periphery of a wheel, and ribs on said wheel, upon which the teeth of the wheels ride, all combined substantially as described.

14. An engine having valves provided with toothed wheels and valve-operating wheels having lugs and ribs, said lugs having suitable buffers therein, substantially as described.

15. An engine having a governor-wheel, and a cut-off wheel having a toothed cam attached to its hub, and weighted levers secured to said governor-wheel and having tension-springs and racks, said racks meshing with pinions, substantially as and for the purposes set forth.

16. An engine having a governor-wheel and a cut-off wheel for operating a set of valves located in the steam admission and exhaust ports, substantially as and for the purposes set forth.

17. An engine having a wheel provided with a governor to control a cut-off wheel, both of said wheels adapted to operate and control a set of valves, substantially as and for the purposes set forth.

FRANZ HERLT.
JOSEF HIRSCHMANN.

Witnesses:
JOHN A. WIEDERSHEIM,
A. P. JENNINGS.